United States Patent
Yang (10) Patent No.: US 9,336,623 B2
(45) Date of Patent: May 10, 2016

(54) MULTILEVEL DISPLAY CONTROL LIST IN TILE BASED 3D COMPUTER GRAPHICS SYSTEM

(75) Inventor: Xile Yang, Hertfordshire (GB)

(73) Assignee: Imagination Technologies Limited, Kings Langley (GB)

(*) Notice: Subject to any disclaimer, the term of this patent is extended or adjusted under 35 U.S.C. 154(b) by 234 days.

(21) Appl. No.: 12/998,948

(22) PCT Filed: Dec. 21, 2009

(86) PCT No.: PCT/GB2009/002932
§ 371 (c)(1),
(2), (4) Date: Aug. 8, 2011

(87) PCT Pub. No.: WO2010/070302
PCT Pub. Date: Jun. 24, 2010

(65) Prior Publication Data
US 2011/0292032 A1    Dec. 1, 2011

(30) Foreign Application Priority Data

Dec. 19, 2008 (GB) .................................. 0823254.8

(51) Int. Cl.
*G06T 15/00* (2011.01)
*G06T 11/40* (2006.01)

(52) U.S. Cl.
CPC ............... *G06T 15/005* (2013.01); *G06T 11/40* (2013.01)

(58) Field of Classification Search
USPC ................................................ 345/423, 419
See application file for complete search history.

(56) References Cited

U.S. PATENT DOCUMENTS

| 5,295,235 A | 3/1994 | Newman |
| 5,392,392 A | 2/1995 | Fischer et al. |

(Continued)

FOREIGN PATENT DOCUMENTS

| CN | 1610926 A | 4/2005 |
| CN | 101067869 A | 11/2007 |

(Continued)

OTHER PUBLICATIONS

Antochi, Iosif, et al. "Scene Management Models and Overlap Tests for Tile-Based Rendering." Digital System Design, 2004. DSD 2004. Euromicro Symposium on. IEEE, 2004.*

(Continued)

*Primary Examiner* — Barry Drennan
*Assistant Examiner* — Richard M Russell
(74) *Attorney, Agent, or Firm* — Vorys, Sater, Seymour and Pease LLP; Vincent M DeLuca (57) ABSTRACT

A method and apparatus are provided for rendering a 3 dimensional computer graphics image. The image is divided into plurality of rectangular tiles which are arranged in a multi level structure comprising a plurality of levels of progressively larger groupings of tiles. Image data is divided into a plurality of primitive blocks and these are assigned to groupings of tiles within the multi level structure in dependence on the groupings each one intersects. Control stream data is derived for rendering the image and this comprises references to primitive blocks for each grouping of tiles within each level of the multi level structure, the references corresponding to the primitive blocks assigned to each grouping and control stream data is used to render the primitive data into tiles within the groupings of tiles for display. This is done such that for primitive blocks which intersect a plurality of tiles within a grouping, control stream data is written for the grouping of tiles rather than for each tile within the grouping.

12 Claims, 5 Drawing Sheets

(56) References Cited

U.S. PATENT DOCUMENTS

| | | | |
|---|---|---|---|
| 5,767,856 | A | 6/1998 | Peterson et al. |
| 5,867,166 | A | 2/1999 | Myhrvold et al. |
| 6,084,591 | A | 7/2000 | Aleksic |
| 6,104,417 | A | 8/2000 | Nielsen et al. |
| 6,362,818 | B1 | 3/2002 | Gardiner et al. |
| 6,380,935 | B1 | 4/2002 | Heeschen et al. |
| 6,697,063 | B1 | 2/2004 | Zhu |
| 6,798,410 | B1 * | 9/2004 | Redshaw et al. ............. 345/427 |
| 6,856,320 | B1 | 2/2005 | Rubinstein et al. |
| 6,972,768 | B2 * | 12/2005 | Hussain et al. ............. 345/531 |
| 7,102,646 | B1 | 9/2006 | Rubinstein et al. |
| 7,170,515 | B1 | 1/2007 | Zhu |
| 7,310,100 | B2 * | 12/2007 | Hussain ........................ 345/557 |
| 7,324,115 | B2 | 1/2008 | Fraser |
| 7,405,734 | B2 | 7/2008 | Foran |
| 7,834,872 | B2 | 11/2010 | Fenney et al. |
| 8,189,007 | B2 | 5/2012 | Kim |
| 2002/0039100 | A1 | 4/2002 | Morphet |
| 2003/0123089 | A1 | 7/2003 | Doyle |
| 2004/0155878 | A1 | 8/2004 | Inazumi |
| 2004/0233207 | A1 * | 11/2004 | Morphet ........................ 345/553 |
| 2004/0246251 | A1 | 12/2004 | Fenney et al. |
| 2005/0057571 | A1 | 3/2005 | Stevens |
| 2005/0122338 | A1 * | 6/2005 | Hong et al. .................... 345/546 |
| 2005/0285867 | A1 | 12/2005 | Brunner et al. |
| 2007/0146378 | A1 * | 6/2007 | Sorgard et al. ................ 345/581 |
| 2008/0098201 | A1 * | 4/2008 | Stuttard ............... G06F 9/3001 712/22 |
| 2009/0066694 | A1 | 3/2009 | Redshaw et al. |

FOREIGN PATENT DOCUMENTS

| | | |
|---|---|---|
| CN | 101127125 A | 2/2008 |
| GB | 2298111 A | 8/1996 |

OTHER PUBLICATIONS www.merriam-webster.com/dictionary/respective.*
www.dictionary.reference.com/browse/respective.*
Response to non-final office action in U.S. Appl. No. 12/998,972, Jun. 28, 2013.

* cited by examiner

FIG. 1

PRIOR ART

PRIOR ART

MULTILEVEL DISPLAY CONTROL LIST IN TILE BASED 3D COMPUTER GRAPHICS SYSTEM

FIELD OF THE INVENTION

This invention relates to 3-dimensional computer graphics systems, and in particular to systems which use tile based rendering.

BACKGROUND TO THE INVENTION

As processing power has increased, the complexity of 3-dimensional computer generated images has also increased. Computer models for very complicated 3D objects, like human movements using vertices and triangle meshes have become easier to generate. This kind of 3D model can be sent to a 3D computer graphics system and animated 3D images generated on a computer screen. Computer generated 3D animated images are widely used in 3D computer games, navigation tools and computer aided engineering design tools.

3D computer graphics systems have to cope with demands for more complex graphics and faster speed display. As the details in the display model increase, more and more primitives and vertices are used. Also, as the texture and shading techniques evolve, more and more information is attached to primitive and vertex data. In modern games there may be over a million primitives in a render. Therefore, memory bandwidth is a very big factor affecting the performance of computer graphics systems.

Tile based rendering systems are well-known. These subdivide an image into a plurality of rectangular blocks or tiles. As in British Patent No. GB2343603 and International Patent Application No. WO 2004/086309 these systems divide a render surface into sub surfaces in n×m pixel tiles, a primitive like triangle, line or point is only to be processed in the tiles which overlap with the primitive.

Figure 1:
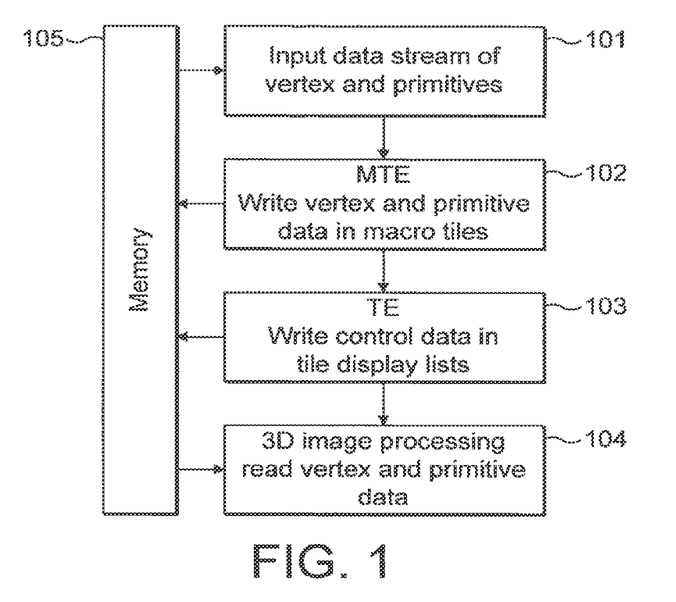
FIG. 1 shows an overview of the main steps performed when implementing tiling in a tile based 3D computer graphics system, as described above.

The main steps performed for tiling in a tile based 3D computer graphics system are shown in FIG. 1. These are as follows:

1. An input data stream of primitives and vertices is received at 101 in FIG. 1. Primitives in similar locations may arrive sequentially in time, such as triangles strips and fans.

2. A Macro Tiling Engine (MTE) transforms the vertices into screen space, removes primitives which may be back facing or clipped by a clipping plane using well-known methods. The primitives are then grouped into primitive blocks with a fixed maximum number of vertices and primitives, and are written into memory at 102 in FIG. 1. The number of vertices and primitives together with the memory addresses of the primitive blocks (primitive block pointers) are sent to a Tiling Engine at 103 to be added to a control stream for a display list for the tiles which are covered by the primitives.

Figure 2:
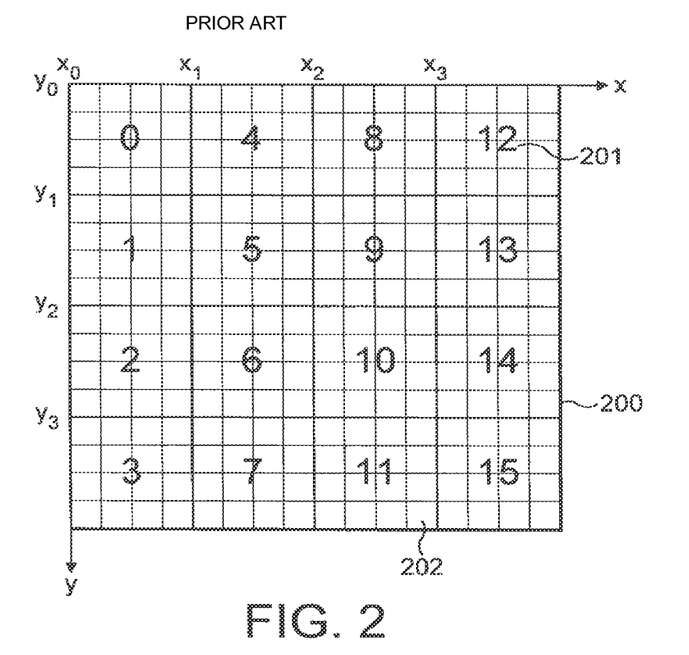
FIG. 2 shows macro tiles and tiles on screen as used in a tile based 3D computer graphics system, as described above.

To minimize the impact of memory bandwidth to fetch primitive and vertex data, primitives are grouped into primitive blocks in macro tiles according to a bounding box for the primitive block. In FIG. 2 a macro tile 201 is a rectangular area of the screen 200 with a fixed number of tiles 202. A macro tile for example can be a quarter or $16^{th}$ of the screen size. This structure is used to localize primitive blocks and reduce memory bandwidth. When primitives in a primitive block cross macro tiles, they are written to a special macro tile list called a global macro tile list. In this way the parameter data for a primitive block are only written once. Primitives from a macro tile can only be accessed by the tiles inside the macro tile, while primitives from the global macro tile list can be accessed by all the tiles.

3. Each primitive from a primitive block which is written by Macro Tiling Engine 102, is checked against each tile inside the bounding box of the primitive block. The primitive block is added to the display list for any tile which is covered by any primitives in the primitive block. The control data written in the control stream associated with the display list of the tile includes a primitive block header for the number of vertices and primitives in the primitive block, a primitive block pointer for the memory address of the primitive block written to, and a primitive mask for the primitives which are visible in the tile.

Separate memory spaces are allocated to each tile for the control stream data in the display list. A memory address pointer called a tall pointer is used for the next free address in the control stream data of each tile.

To improve memory access for the control streams in tiles, a small cache Tail Pointer Cache can be added to the Tiling Engine 103. The memory location of the end of the control stream in a tile is stored and read from the Tail Pointer Cache, which reduces main memory accesses from the Tiling Engine.

Figure 3:
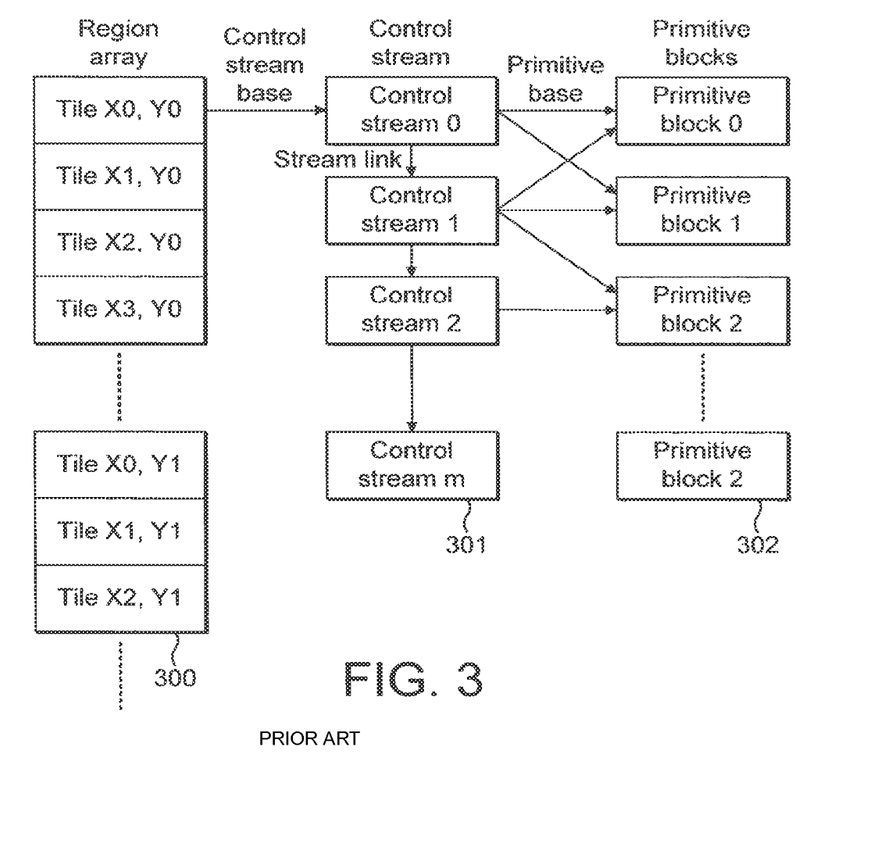
FIG. 3 shows an overview of the data structure used for thing, as discussed above.

4. 3D image processing in a the based 3D computer graphics system is performed at 104 for each tile of the screen from a region array 300 of FIG. 3. It traverses through the control stream of each tile 301 in FIG. 3, reads the vertex and primitive data from memory addresses pointed to by the primitive block pointer in the control data 302. Image processing operations like hidden surface removing, texturing and shading are performed on all the primitives valid in the tile from the primitive block.

Figure 6:
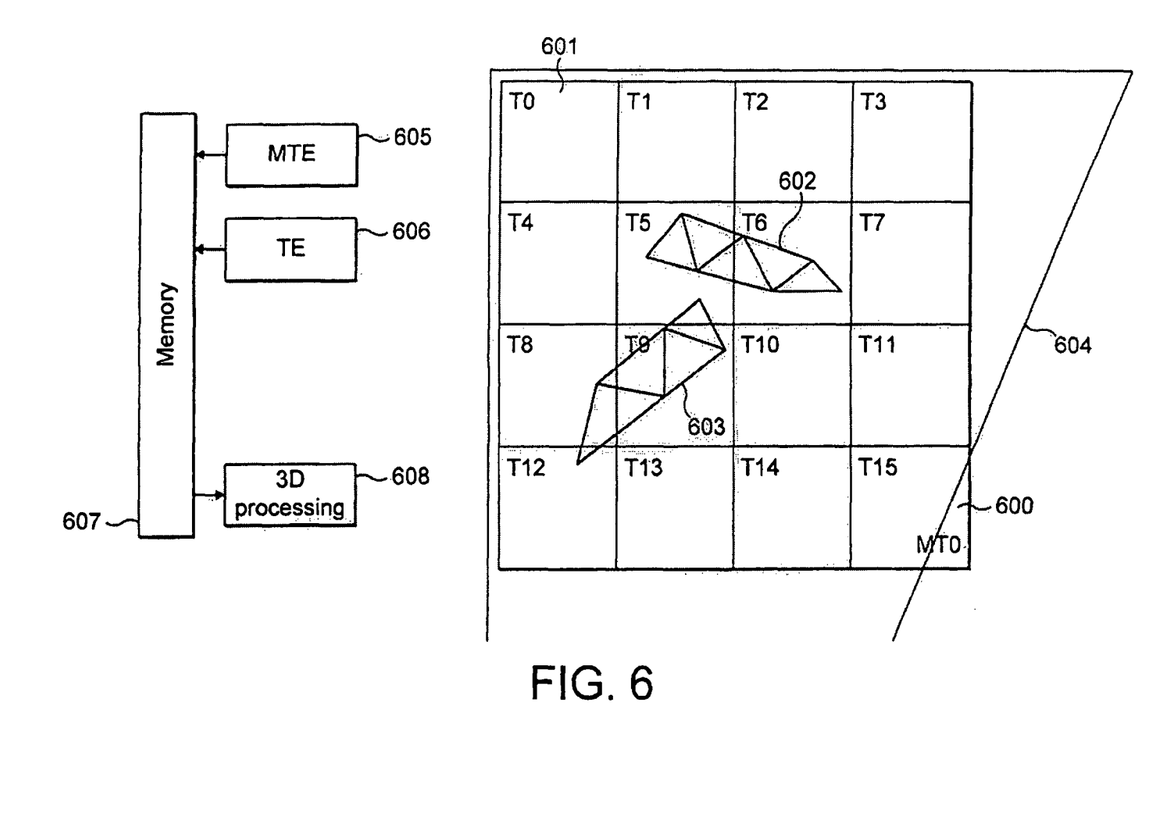
FIG. 6 shows an example of tile based render.

An example of tile based render is shown in FIG. 6. A macro tile MT0 600 which is part of the screen has 16 tiles 601 inside. Two triangle strips 602, 603 and a big triangle 604 are processed by Macro Tile Engine MTE 605 and projected into part of the screen in MT0. The vertex and primitive data associated with the three primitive blocks are written to memory 607 with their own memory addresses. The memory address pointers of the three primitive blocks are then passed to Tiling Engine TE 606 for tiling processing. All the tiles are traversed by Tiling Engine to decide if any primitives are inside the tile and control stream data associated to the primitive block which is visible in the tile are written to memory for the tile display list. In the example display control stream in T5 will include control data for the address pointers of the three primitive blocks and triangle visible mask of the triangles within the three primitive blocks. For example the first three triangles from left in primitive block 602 and the first triangle from right of primitive block 603 are visible in T5 together with triangle 604. For tile T9 the control stream data will only consists of the information from primitive block 603 and 604. Meanwhile the control data such as address pointer of the vertex data associated to primitive block 602 are inserted into two control streams for tile T5 and T6, while control data associated with primitive block 604 are inserted into control streams for every tile in the macro tile MT0.

In 3D render processing 608 all the tiles are processed one by one in the order of region array as 300 in FIG. 3. For each tile in 3D processing control data from the tile control stream are read from memory first, as 301 in FIG. 3. Vertex and primitive data associated to the primitive blocks in the tile control data are read from memory as 302 in FIG. 3 therefore all the triangles which are visible to the tile are processed and rendered to screen.

For tile based computer graphics system a render is performed on a tile by tile basis. The big advantage of tile based rendering is that it significantly reduces the requirement for large graphics system internal storage and memory bandwidth.

The disadvantage of tile based rendering is that increased control data is needed for the display list in each tile. Display control data needs to be written for all the tiles which a triangle covers. For big triangles which cover many tiles the total amount of control data written is significant.

For example a render with screen size 1920×1080 can be divided into 8160 tiles of 16×16 pixels. A big triangle which covers the whole screen has to be added in the display lists of all the tiles. If there are two 32 bit words needed for the control data, then the total control stream data is nearly 64 KB for the single full screen triangle. The amount of control data needed in this case has a significant impact on the memory space requirement and memory bandwidth, therefore it affects the performance of the render in a tile based 3D computer graphics system.

In UK Patent Application No. 0717781.9, a system is described which processes two tiles at the same time in order to improve the performance of a Tiling Engine. The control stream data from the two adjacent tiles are combined into a single display list, which reduces the total control stream data to around 32 KB in the above example. The size of the control stream data is about half the size in this case, but it is still a significant amount of control data for a single triangle.

SUMMARY OF THE INVENTION

Preferred embodiments of the invention provide a method and apparatus for enabling multi level display control lists in a tile based 3D computer graphics system. This reduces the amount of tile based control stream data written, especially for the scene with large triangles, thereby reducing the memory bandwidth and enhancing the performance of tile based 3D graphics systems.

In a tile based rendering system triangles covering multiple tiles consume memory and bandwidth for every tile into which a reference must be placed in the control stream data. The proposed invention alleviates this problem by introducing a multi-level list structure in which subsequent levels represent progressively larger groups of tiles such that a triangle overlapping many tiles will only need to write a small number of references to the control stream. In the described embodiment the multi-level list structure is implemented at three levels, tile level (1 tile), tile block level (N×M and macro tile level (X×Y tiles). The proposed invention can be easily expanded such that multiple sub level representation can be used to make the control stream for a display list even more efficient.

In the preferred embodiment there is provided method for rendering a 3 dimensional computer graphics image comprising the steps of:
 subdividing the image into a plurality of rectangular tiles;
 arranging the tiles in a multi level structure comprising a plurality of levels of progressively larger groupings of tiles;
 dividing image data to be rendered into a plurality of primitive blocks containing image data required to render the image;
 assigning each primitive block to a grouping of tiles within the multi level structure in dependence on the grouping of tiles it intersects, such that each primitive block is assigned to a grouping in one of the levels in the multi level structure;
 deriving control stream data for rendering the image, the control stream data comprising references to primitive blocks for each grouping of tiles within each level of the multi level structure corresponding to the primitive blocks assigned to each grouping; and
 using the control stream data to render primitive data into tiles within the groupings of tiles for display.

DETAILED DESCRIPTION OF A PREFERRED EMBODIMENT

In a tile based 3D computer graphics system as described above, the Tiling Engine takes primitive blocks from the Macro Tiling Engine and computes the minimum number of tiles needed to render the primitives. The minimal list of tiles is then processed and a primitive block pointer for the address of the primitive block data along with a primitive header word describing the primitives present in the tile are written to dynamically allocated memory as control stream data at 301 in FIG. 3.

Each tile has its own fixed size memory space used for the control stream data. The memory blocks in this space are allocated on demand by the tile based 3D computer graphics system. When new data to be added to the control stream for a particular tile exceeds the current memory blocks allocated, a new block allocation is requested and the old control stream is linked to the new block allocation using a stream link. If the Macro Tiling Engine indicates the end of a scene via a terminate signal, all the tiles are processed, and control streams for tiles in the valid region are ended with a terminate word.

In a tile based 3D computer graphics system the vertex and index data for a primitive block may only be written once in a macro tile to which the primitive block belong to, or in the global macro tile list when the bounding box of the primitive block crosses macro tiles. When the primitive blocks contain large primitives the control stream data may need to be written multiple times to all the tiles which the primitives overlap. In the extreme case of a full screen triangle, the control stream data has to be written for every tile on screen. The multiple repetitions of control stream data written may cause a significant increase in memory bandwidth.

In embodiments of the invention, a multi level display control list is used instead of a single tile based display control list. Control stream data in the multi level display control list can be based on groupings of tiles such as macro tiles and tile blocks rather than individual tiles, although the number of sub-levels selected is a design choice for the skilled person. The control list comprises control stream data for each grouping of tiles, the control stream data comprises reference to primitive blocks to be rendered into each respective grouping of tiles, for use in rendering the image for display. An example structure for the control stream data is described below. Greater and lower degrees of complexity may be implemented.

Multi Level Display Control List

Figure 4:
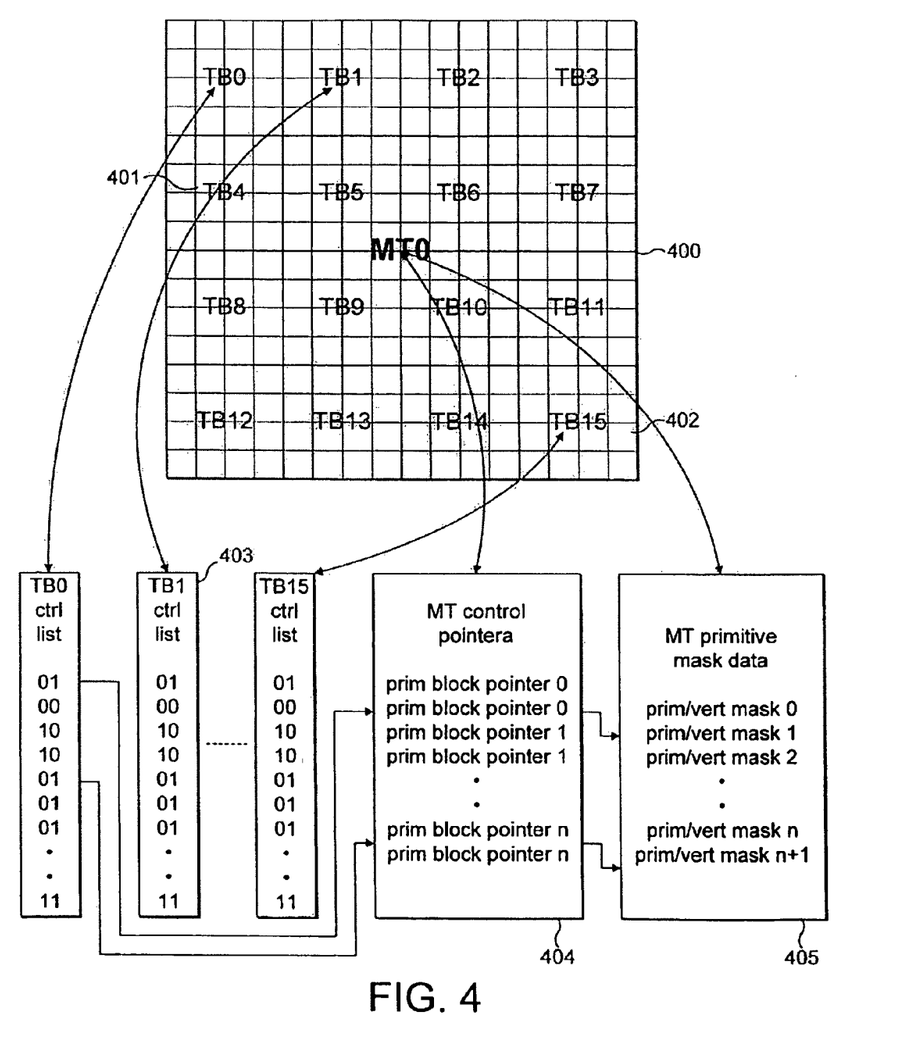
FIG. 4 shows an overview of the data structure used for multi level display control list in a macro tile in an embodiment of the invention; and, FIG. 5 shows an overview of the data structure used for control stream data in a multi level display control list in an embodiment of the invention.

In an embodiment of the invention, macro tiles divide an image into 16 Tile Blocks (TB), the number of tiles in a tile block is fixed for a render according to the macro tile size. Assume the macro tile size is 16 tiles by 16 tiles (256 tiles), the tile blocks 401 in a macro tile 400 will each be the same size of 4 tiles by 4 tiles (16 tiles) as shown in FIG. 4. Control stream lists are formed for each Tile Block in a macro tile. For 4 macro tiles there are 16×4=64 control stream lists while for 16 macro tiles there are 16×16=256 control stream lists.

A render is still performed on a tile by tile basis, but the tiles in a tile block will share the same control stream list.

The main benefit of using a tile block based multi level display control list is to reduce the amount of control data needed and reduce the memory bandwidth, especially for large primitives which cover many tiles. Other benefits include:

There are no tile based control stream lists, therefore there is no need for the storage of the next free address of control stream data to write in each tile. A tile used flag of 1 bit may be used for each tile, in order to identify if a tile is an empty tile or not when the scene is terminated.

Also there is no need to write out a control stream base address word for each tile in a region array, due to the number of macro tile based control stream lists is limited.

Control Stream Data Structure

The data structure of a multi level display control stream list system consists of three main parts: Tile Block Control List 403, Control Pointers 404 and Primitive Vertex Masks 405 as shown in FIG. 4.

Tile block control lists 403 are provided per tile block based (TB0, TB1 . . . TB15). There are 16 tile block control lists in a macro tile structure such as 403 in FIG. 4. Each tile block control list has its own memory space allocated in a macro tile's allocated memory space.

Control pointers 404 and primitive mask data 405 in FIG. 4 are provided per macro tile. These have separate memory space in a macro tile's allocated memory.

Tile Block Control List

In a multi level display control list system the control stream list is provided per tile block (TB0 etc) based. There is a tile block control list for each of the tile blocks in a macro tile as 500 in FIG. 5. The tile block control list includes references to each primitive block referred by that tile block.

Because the tile block control list is shared between all the tiles in the tile block, a primitive block referenced in the control list may only be valid for some of the tiles in the tile block. The data structure used in this embodiment of the invention is designed to use short cuts to skip the tiles in which a primitive block does not need to be processed as soon as possible when rendering an image. For the tiles for which the primitive block does need to be processed, embodiment of the invention obtains all the information for processing the primitive block in a minimum amount of data.

Tile Block Control Word

Because the address pointers for vertex data in primitive blocks are written in a per macro tile list 404, they are shared by all tile blocks in the macro tile. In a specific tile block not all of the primitive blocks in the macro tile may be referenced in the tile block. It is efficient to be able to skip these primitive blocks which are not needed in the tile block.

Figure 5:
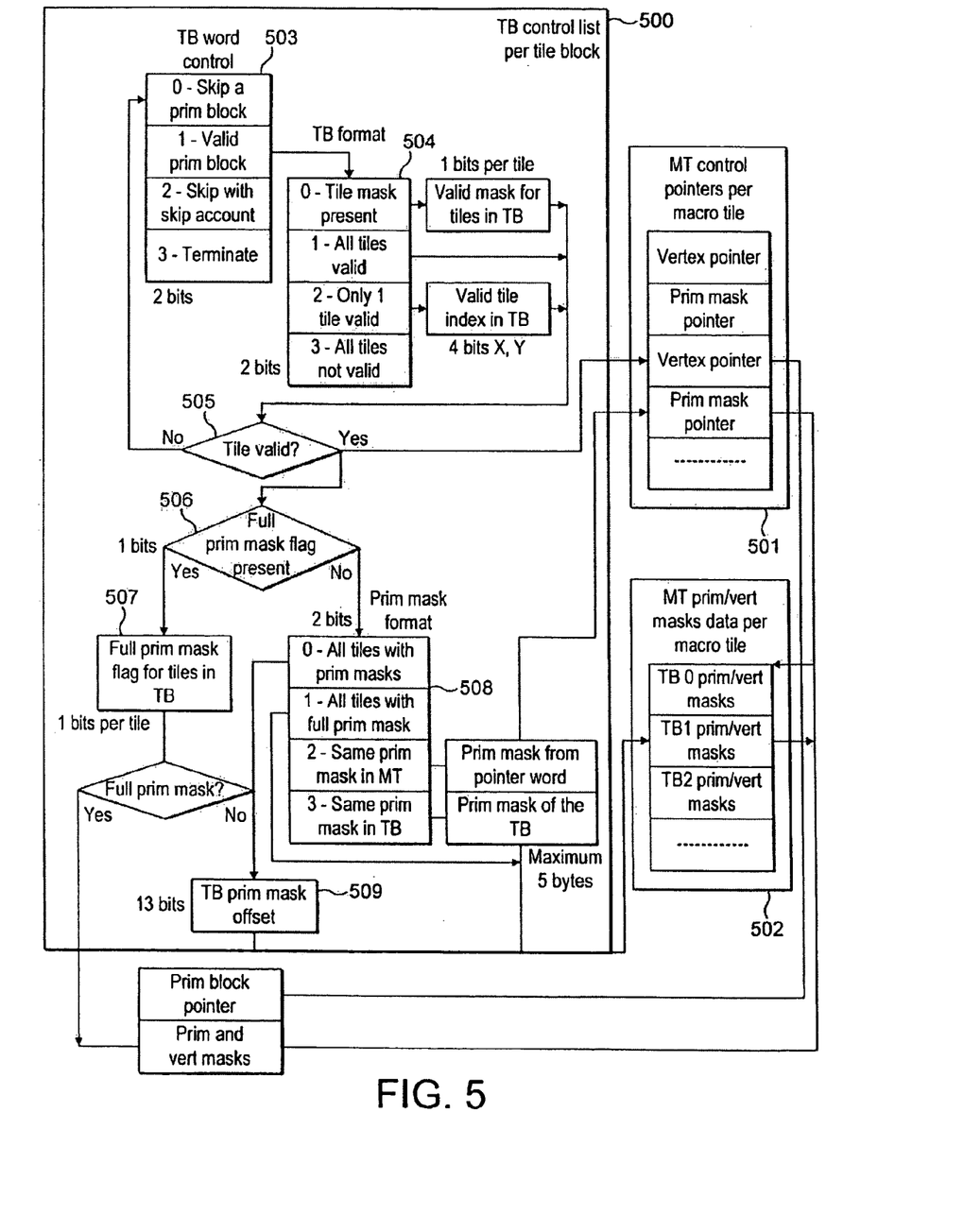

Tile Block Control Word 503 in FIG. 5 is the top level control word of the multi level display control list stream. It has two bit encoding as shown in Table 1, and is used primarily to determine whether a primitive block is to be processed for that tile block.

TABLE 1

Tile Block Control Word

| Value | Description |
| --- | --- |
| 0 | Skip one primitive block |
| 1 | Valid primitive block |
| 2 | Skip with skip count |
| 3 | Terminate |

Therefore as shown in Table 1, there are 4 possible operations defined by the two bit Tile Block Control Word:

Skip One Primitive Block

When a primitive block does not have any primitives in it to cover any tiles in the tile block, the primitive block is skipped without being processed.

Valid Primitive Block

When any primitives in a primitive block cover any tiles in the tile block, the primitive block cannot be skipped. Further information is needed in the multi level display control list to process the primitive block for the tiles in the tile block.

Skip with Skip Count

This is a short cut which is used when the tile block can skip a number of primitive blocks consecutively, i.e. These primitive blocks do not need to be processed for the tile.

In this embodiment there is a skip count offset of 5. If the skip count is less than 5 skip one primitive block encoding is used repeatedly. When the skip count is greater than or equal to 5 skip with skip count is used. The maximum skip count is 255+5=260 for 8 bits skip count. When the skip count is great than 260 more than one skip encoding is needed.

Terminate

The terminate word indicates the multi level display control list is terminated for the tile block.

Tile Block Format Word

Tile Block Format Word 504 in FIG. 5 in the tile block control list is used after each valid primitive block encoding (value 1 in Table 1) of the Tile Block Control Word. It is used to identify whether the primitive block is valid for the tile which is being processed. The 2 bit encoding of the Tile Block Format Word is:

TABLE 2

Tile Block Format Word

| Value | Description |
| --- | --- |
| 0 | Tile masks present |
| 1 | All tiles valid, tile masks not present |
| 2 | Only one tile valid |
| 3 | All tiles not valid, tile masks not present |

As shown in Table 2, there are 4 possible operations defined by the two bits in Tile Block Format Word:

Tile Masks Present

When a primitive block does not have primitives to cover every tile in the tile block i.e. some tiles are not overlapped by any primitives in the primitive block, a 1 bit per tile valid tile mask is used to skip the tiles in which the primitive block does not need to be processed. The total number of bits for the tile mask is equivalent to the number of tiles in tile block.

All Tiles Valid

When a primitive block has primitives to cover every tile in the macro tile or tile block, then the primitive block is valid for all tiles in the tile block. In this case no tile masks are needed.

Only One Tile Valid

When a primitive block covers only one tile in a macro tile, or one tile in a tile block, the tile index X and Y for the valid tile in the tile block are used to reduce the amount of data needed. In this case no tile masks are needed.

For a tile block with 8×8 tiles a 64 bit mask is needed to indicate if each tile is valid. If 4 bits are used for the tile index X and Y of the only valid tile in the tile block, then only 8 bits are needed.

All Tiles Not Valid

When a primitive block has no primitives to cover any tile in the macro tile or tile block, then the primitive block is not valid for any tiles in the tile block. In this case no tile masks are needed. This case can only happen in the tile block format word for sub level tile blocks.

After the Tile Block Format Word has been processed, the current primitive block can be identified as valid or not for the tile which has been processed at 505 in FIG. 5.

Full Primitive Mask Flag Present

The Full Primitive Mask Flag Present 506 in FIG. 5 is 1 bit flag for the primitive block which is valid for the current tile to indicate if the full primitive mask flags are present or not in the primitive block.

When all primitives in the primitive block are visible in a tile it is called a full primitive mask. Only a 1 bit flag is needed for a full primitive mask instead of individual bit masks for each primitive and vertices in the primitive block.

Full Primitive Mask Flags

If the 1 bit flag of Full Primitive Mask Flag Present 506 in FIG. 5 is set, then this causes 1 bit per tile full primitive mask flags 507 in FIG. 5 to be set for each tile in the tile block to indicate whether each respective tile has a full primitive mask or not. The total number of bits of the Full Primitive Mask Flags is equal to the number of tiles in the tile block.

If there is not a full primitive mask, the vertex mask is concatenated by the primitive mask and made byte aligned. For a primitive block with a maximum 16 vertices and 32 primitives, the vertex mask is maximum 2 bytes, and the primitive mask is 4 bytes. The size of the primitive and vertex masks are kept the same for a tile block. The primitive and vertex mask data are written in Primitive Mask Data stream 502 per macro tile as in FIG. 5.

For any tile block which has tiles with a full primitive mask flag, the use of a Full Primitive Mask Flag will save the time and memory space to get the information for valid primitives and vertices in the primitive block. If the primitive block is invalid for the tile been processed, these flags can be skipped.

Primitive Mask Format Word

A two bit Primitive Mask Format Word 508 in FIG. 5 in the tile block control list is present when the 1 bit flag of Full Primitive Mask Flag Present 506 in FIG. 5 is not set, that is to say there are no Full Primitive Mask Flags.

TABLE 3

Primitive Mask Format Word

| Value | Description |
| --- | --- |
| 0 | All tiles in the tile block with primitive mask present |
| 1 | All tiles in the tile block with full primitive mask |

TABLE 3-continued

Primitive Mask Format Word

| Value | Description |
| --- | --- |
| 2 | Same primitive mask in the macro tile |
| 3 | Same primitive mask in the tile block |

As in Table 3, the Primitive Mask Format Word contains 4 special cases for primitive mask format in the tile block:

All Tiles in Tile Block with Primitive Mask Present

This indicates all the tiles in tile a block which is covered by the primitive block have primitive masks present. That is no tiles have a full primitive mask, and the primitive masks are not the same within the tile block. In this case the primitive and vertex masks are read from the Primitive Mask Data stream 502 in FIG. 5.

All Tiles in Tile Block with Full Primitive Mask

This indicates that all the tiles in tile block covered by the primitive block have full primitive masks. There is no need for the 1 bit per tile Full Primitive Mask Flags 507 in FIG. 5.

Same Primitive Mask in Macro Tile

This indicates that all the tiles in macro tile covered by the primitive block have the same primitive mask, and the total bits of the common primitive mask and vertex mask are less than or equal to 24 bits.

The primitive and vertex mask data are written in a data stream 502 in FIG. 5 for each macro tile in a separate 4 KB memory page. The start address of the primitive and vertex mask data stream is stored in Control Pointers 501 in FIG. 5 as Primitive Mask Pointer Word. There are 3 bytes free bits in the address pointer word Primitive Mask Pointer Word due to the 4 KB aligned address.

In this case the common primitive mask and vertex mask for the macro tile are no more than 24 bits, they can be written to the LSB 3 bytes of Primitive Mask Pointer Word in the current Control Pointers.

Same Primitive Mask in Tile Block

This indicates that all the tiles in a tile block which is covered by the primitive block have the same primitive mask, or have that same primitive mask in a macro tile, but the total bits of the common primitive mask and vertex mask are more than 24 bits.

In this case the common vertex mask is concatenated by the primitive mask, and both are written in the Tile Block Control List with a leading 3 bits for the number of bytes of the primitive and vertex masks.

The type of primitive mask in a tile being processed can be defined after the process as Full Primitive Mask Flags 507 or Primitive Mask Format Word 508 in FIG. 5.

A tile which has been processed has primitive and vertex masks present when either Full Primitive Mask Flags 507 are processed but the tile is not in full primitive mask, or Primitive Mask Format Word 508 is set to 0 (all tiles in the tile block with primitive block mask present). In these two cases the primitive and vertex masks for the tile need to be read from the Primitive Mask Data stream 502 in FIG. 5.

In all other cases the primitive and vertex masks are known because of either a full mask or the same mask in a macro tile/tile block.

Tile Block Primitive Mask Offset Present

Primitive and vertex masks for each tile in the macro tile are written to the Primitive Mask Data stream 502 in FIG. 5. The start address of the primitive and vertex mask data for the macro tile is defined by Control Pointers 501 in FIG. 5 as Primitive Mask Pointer Word.

The primitive and vertex data are byte aligned for each tile, and 32 bits aligned for each tile block. For the tile blocks in which the primitive and vertex mask data are not written at the start of the Primitive Mask Data stream, a primitive mask offset is needed to get to the start of the primitive and vertex mask data for the tile block from the data stream. Because the primitive and vertex mask data are the same size for each tile in a tile block, a tile index can be used in conjunction with the tile block primitive mask offset to read back the mask data for a tile.

A 1 bit flag is used to indicate that a tile block primitive mask offset is present when the primitive mask data in the tile block is not at the start of the macro tile primitive mask data stream. The 1 bit flag is only needed in the two cases where the primitive and vertex masks for the tile need to be read from the Primitive Mask Data stream.

Tile Block Primitive Mask Offset

Tile Block Primitive Mask Offset 509 in FIG. 5 is a 13 bit word offset for the start address of the primitive mask data in the tile block from the start address of the primitive mask data of the primitive block in the macro tile. The field is only present when a Tile Block Primitive Mask Offset Present bit is set.

At the end of process, from the Tile Block Control. List 500 in FIG. 5 for the primitive block, it is known whether the primitive block needs to be processed in the current tile. If the primitive block does need to be processed, the primitive and vertex masks are known for the current tile as well.

Macro Tile Control Pointers

There are two 32 bits control pointer words in Macro Tile Control Pointers 501 in FIG. 5 for each primitive block which is valid in the macro tile. If a primitive block is determined to be valid for a tile at 505 then the Macro Tile Control Pointers 505 are used to access the primitive data from a block.

Primitive Block Pointer Word

The primitive Block Pointer Word is mainly used to store the start address of the vertex data stream for a primitive block. The structure of the 32 bits Primitive Block Pointer Word can be seen in Table 4:

TABLE 4

Primitive block pointer Word

| Field | Name | Bits | Description |
|---|---|---|---|
| 0 | HT_PRIM_COUNT | 31:27 | Number of primitives - 1 in the primitive block, maximum 32 primitives. |
| 1 | HT_VERT_PTR | 25:0 | 32 bits aligned address pointer for the primitive block vertex data, 256 MB range. |

Primitive Mask Pointer Word

Primitive Mask Pointer Word is mainly used to store a start address of the primitive and vertex mask data stream in a macro tile for the primitive block. The structure of the 32 bits Primitive Mask Pointer Word can be seen in Table 5:

TABLE 5

Primitive Mask Pointer Word

| Field | Name | Bits | Description |
|---|---|---|---|
| 0 | HT_VERTEX_COUNT | 31:28 | Number of vertices - 1 in the primitive block, maximum 16 vertices. |
| 1 | HT_PRIM_MASK_PTR | 25:12 | 32 bits aligned address pointer for the start of primitive and vertex mask data in the macro tile for the primitive block, 256 MB range. |
| 2 | HT_SAME_PRIM_MASK_IN_MT | 11:0 | The common primitive and vertex masks for the macro tile. |

The field 2 HT_SAME_PRIM_MASK_IN_MT is only valid when Primitive Mask Format Word is set to 2 as in Table 3, which means there is a common primitive mask for the macro tile.

Because the control pointers are fixed 2 32 bits per primitive block, the control pointers can be skipped for the primitive blocks which are not valid in a tile block.

Macro Tile Primitive Mask Data

When a primitive mask in a tile is neither a full mask nor the same mask in a macro tile or tile block, the primitive and vertex mask data are written to a Macro Tile Primitive Mask Data stream 502 in FIG. 5.

In Primitive Mask Data stream a vertex mask is concatenated with a primitive mask for a tile. The number of bits is the number of vertices plus the number of primitives in the primitive block then rounded up to bytes. The size of the primitive and vertex mask data are kept the same within a tile block.

The Macro Tile Primitive Mask Data stream is macro tile based, primitive and vertex mask data from each tile block written continuously to the memory page.

The start address of primitive and vertex mask data for a primitive block in a tile block is 32 bits aligned. The start address is stored by Control Pointers 501 in FIG. 5 for the primitive block as Primitive Mask Pointer Word.

The 32 bits offset of the start address for the tile block from the start address of the primitive block in macro tile is stored in Tile Block Control List 500 as 13 bit Tile Block Primitive Mask Offset 509 in FIG. 5 when Tile Block Primitive Mask Offset Present bit is set. If Tile Block Primitive Mask Offset Present bit is not set that means the offset of the primitive mask data in the tile block is 0. Because the primitive and vertex mask data are the same size for each tile in a tile block, a tile index can be used in conjunction with the tile block primitive mask offset to read back the primitive and vertex mask data for a tile.

Tile Block Sub Level Mask in Tile Block Control List

As a macro tile is divided into 16 tile blocks. Primitive blocks which are not visible in a tile block can be skipped. Within a tile block, valid tile masks are used to skip tiles which the primitive block does not need to process. The amount of control data read in 3D processing will be reduced when further sub level blocks are introduced in each tile block.

The tile block control list described can be easily expanded into a multi level display control list structure.

For any valid primitive blocks in the tile block control list, the tile block format word 504 in FIG. 5 can be expanded into 4 sub level tile block format words instead of one tile block format word. Each sub level tile block will have a quarter of the tiles from the tile block. The possibility is increased for the sub level tile blocks to encounter the special cases of all tiles valid, all tiles not valid and only one tile valid as 1 to 3 in Tile Block Format Word 504. Furthermore the chances of the sub level tile blocks having all full primitive masks and same primitive mask in Primitive Mask Format Word 508 in FIG. 5 are increased as well. Therefore the amount of control data needed will be reduced compared with one tile block format word.

Multi sub levels can be used to reduce the number of tiles contained in a tile block format word further. This is especially true for the large render size with more tiles in a macro tile.

In a render of 640×480 pixels with multi sample anti-aliasing (MSAA) enabled there are 6×4=24 tiles in a tile block. By adding one sublevel block in a tile block the sub level block size is 3×2=6 tiles. In this case the invalid tiles may be skipped early, and the chance of the tiles getting into the special cases for primitive mask data may be increased in the 6 tiles sub level rather than the 24 tiles tile block.

TABLE 9

Multi Level Display Control List Tile Block Size

| Render Size | MSAA | Macro Tiles | Num of 16 × 16 Tiles | Macro Tile Size | Tile Block Size | Sub Level 1 Block Size | Sub Level 2 Block Size | Sub Level 3 Block Size | Sub Level 4 Block Size |
|---|---|---|---|---|---|---|---|---|---|
| 640 × 480 | no | 16 | 40 × 30 | 12 × 8 | 3 × 2 | 3 × 2 | | | |
| 640 × 480 | yes | 16 | 80 × 60 | 24 × 16 | 6 × 4 | 3 × 2 | | | |
| 1024 × 768 | no | 16 | 64 × 48 | 16 × 12 | 4 × 3 | 2 × 2 | | | |
| 1024 × 768 | yes | 16 | 128 × 96 | 32 × 24 | 8 × 6 | 4 × 3 | 2 × 3 | | |
| 2048 × 2048 | no | 16 | 128 × 128 | 32 × 32 | 8 × 8 | 4 × 4 | 2 × 2 | | |
| 2048 × 2048 | yes | 16 | 256 × 256 | 64 × 64 | 16 × 16 | 8 × 8 | 4 × 4 | 2 × 2 | |
| 4096 × 4096 | no | 16 | 256 × 256 | 64 × 64 | 16 × 16 | 8 × 8 | 4 × 4 | 2 × 2 | |
| 4096 × 4096 | yes | 16 | 512 × 512 | 128 × 128 | 32 × 32 | 16 × 16 | 8 × 8 | 4 × 4 | 2 × 2 |

Table 9 shows the number of tiles in a tile block for some common used render sizes. It also shows the number of tiles in sub level blocks within a tile block.

In the case where the number of tiles in a tile block is not an even number on X or/and Y directions, some of the sub level blocks may never have the full valid tile mask. As render size 1024×768 non MSAA case, the tile block size is 4×3 tiles and sub level size is 2×2 tiles. Inside a tile block the lower two sub level blocks have 2×1 tiles while the top two sub level blocks have 2×2 tiles.

For a small render size sub level blocks may not be needed, like render size 640×480 non MSAA case. For a very large render size with MSAA enabled, multi sub level blocks may be needed, as shown in Table 9.

A Multi Level Display Control List in the embodiment the proposed invention has reduced the amount of control stream data significantly, in some case by 90%. This is achieved by allocating primitive blocks to control stream data for different groupings of tiles within a multi-level structure of progressively larger groupings of tiles such that the number of tiles primitive blocks are written to the control stream data is reduced for blocks that cover a plurality of tiles.

The invention claimed is:

1. A method for rendering a computer graphics image from a 3-D scene in a computer graphics system configured to use a rendering space which is divided into a plurality of tiles, wherein the plurality of tiles are grouped into a plurality of tile blocks, and the plurality of tile blocks are grouped into a plurality of macrotiles, the method comprising:
    grouping primitives of said 3-D scene into primitive blocks;
    for each primitive block, determining a macrotile overlapped by that primitive block, and writing a pointer for that primitive block in a macrotile control list for said macrotile;
    for each tile block of a macrotile, generating control stream data indicating whether a primitive block that overlaps said macrotile is to be processed for that tile block;
    for each tile of a tile block for which a primitive block is to be processed, generating a tile indication indicating whether said primitive block is to be processed or is not to be processed for that tile; and
    using said macrotile control list, control stream data and tile indications to render primitive data into said image.

2. The method according to claim 1, wherein said pointer points to vertex data of a primitive block.

3. The method according to claim 1, wherein said control stream data comprises a control word.

4. The method according to claim 1, wherein said tile indication comprises a tile mask.

5. Apparatus for rendering a computer graphics image from a 3-D scene, comprising:
    a macro tiling engine configured:
        to group primitives of said 3-D scene into primitive blocks,
        for each primitive block, to determine for a rendering space which is divided into a plurality of tiles, wherein the plurality of tiles are grouped into a plurality of tile blocks, and the plurality of tile blocks are grouped into a plurality of macrotiles, a macrotile overlapped by that primitive block;
        to write a pointer for that primitive block in a macrotile control list for said macrotile;
    a tiling engine configured:
        to generate control stream data for each tile block of a macrotile, said control stream data indicating whether a primitive block that overlaps said macrotile is to be processed for that tile block, and
        for each tile of a tile block for which a primitive block is to be processed, to generate a tile indication indicating whether said primitive block is to be processed or is not to be processed for that tile; and
    a 3-D rendering processor configured to use said macrotile control list, control stream data and tile indications to render primitive data into said image.

6. Apparatus according to claim 5, wherein said pointer points to vertex data of a primitive block.

7. Apparatus according to claim 5, wherein said control stream data comprises a control word.

8. Apparatus according to claim 5, wherein said tile indication comprises a tile mask.

9. A non-transitory computer readable storage medium having stored therein computer-executable instructions that when executed, cause at least one processor to:
- group primitives of a computer graphics 3-D scene into primitive blocks;
- for each primitive block, determine for a rendering space which is divided into a plurality of tiles, wherein the plurality of tiles are grouped into a plurality of tile blocks, and the plurality of tile blocks are grouped into a plurality of macrotiles, a macrotile overlapped by that primitive block;
- write a pointer for that primitive block in a macrotile control list for said macrotile;
- generate control stream data for each tile block of a macrotile, said control stream data indicating whether a primitive block that overlaps said macrotile is to be processed for that tile block;
- for each tile of a tile block for which a primitive block is to be processed, generate a tile indication indicating whether said primitive block is to be processed or is not to be processed for that tile; and
- render primitive data into said image using said macrotile control list, control stream data and tile indications.

10. The non-transitory computer readable storage medium according to claim 9, wherein said pointer points to vertex data of a primitive block.

11. The non-transitory computer readable storage medium according to claim 9, wherein said control stream data comprises a control word.

12. The non-transitory computer readable storage medium according to claim 9, wherein said tile indication comprises a tile mask.

* * * * *